United States Patent [19]
Bietenhader

[11] Patent Number: 5,562,264
[45] Date of Patent: Oct. 8, 1996

[54] FUSELAGE STRUCTURE FOR HELICOPTER

[75] Inventor: Claude Bietenhader, Lambesc, France

[73] Assignee: Eurocopter France, Marignane, France

[21] Appl. No.: 392,296

[22] Filed: Feb. 21, 1995

Related U.S. Application Data

[63] Continuation of Ser. No. 91,312, Jul. 14, 1993, abandoned.

[30] Foreign Application Priority Data

Jul. 22, 1992 [FR]  France ................... 92 09052

[51] Int. Cl.⁶ ............... B64C 1/06; B64C 1/12; B64C 1/22
[52] U.S. Cl. ............ 244/120; 244/117 R; 244/119
[58] Field of Search ................ 244/117 R, 118.1, 244/118.2, 118.5, 119, 120; 296/187, 188

[56] References Cited

U.S. PATENT DOCUMENTS

| | | | |
|---|---|---|---|
| 2,294,359 | 1/1942 | Best | 244/117 R |
| 2,337,007 | 12/1943 | Vidal | 244/117 R |
| 2,388,380 | 11/1945 | Bathurst | 244/118.2 |
| 2,442,459 | 6/1948 | Fowler | 244/118.2 |
| 2,827,251 | 3/1958 | Doman | 244/119 |
| 3,605,935 | 9/1971 | Gilbert | 244/118.2 |
| 3,989,562 | 11/1976 | Hladik et al. | 296/187 |
| 4,066,227 | 1/1978 | Buchsel | 244/117 R |
| 4,458,864 | 7/1984 | Colombo et al. | 244/118.5 |
| 4,579,301 | 4/1986 | Brand | 244/117 R |
| 4,593,870 | 6/1986 | Cronkhite et al. | 244/117 R |
| 4,676,545 | 6/1987 | Bonfilio | 244/120 |
| 4,925,132 | 5/1990 | Zider | 244/118.1 |
| 5,037,041 | 8/1991 | Unterhitzenberger | 244/117 R |

FOREIGN PATENT DOCUMENTS

| | | | |
|---|---|---|---|
| 3029575 | 2/1982 | Germany | 244/118.1 |
| 2196922 | 5/1988 | United Kingdom | 244/118.1 |

Primary Examiner—Andres Kashnikow
Assistant Examiner—Virna Lissi Mojica
Attorney, Agent, or Firm—Marshall, O'Toole, Gerstein, Murray & Borun

[57] ABSTRACT

The invention relates to a helicopter fuselage of the type including a central structure to which are linked a front structure, a rear structure and a landing gear, and which supports a transmission gearbox, a main rotor and at least one engine (50), and of the type in which the central structure includes a skeleton (16) fitted with covering elements which define the external shape of the fuselage.

According to the invention, the skeleton (16) of the central structure exhibits substantially the shape of a regular hexahedron consisting of skeleton panels (28, 30, 32, 34, 36, 38) assembled together.

The invention finds an application especially for producing light helicopters.

16 Claims, 7 Drawing Sheets

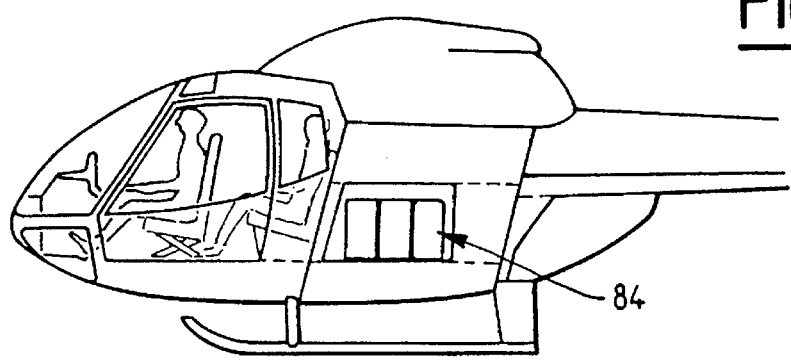
FIG.12
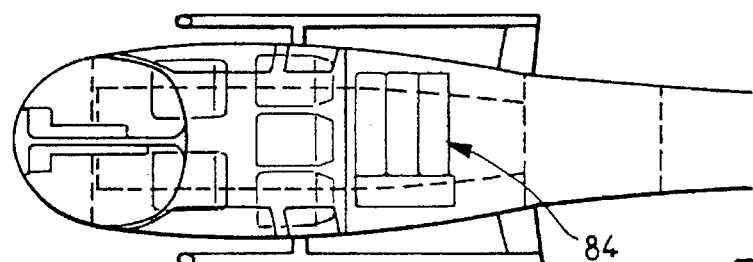
FIG.13
FIG.14
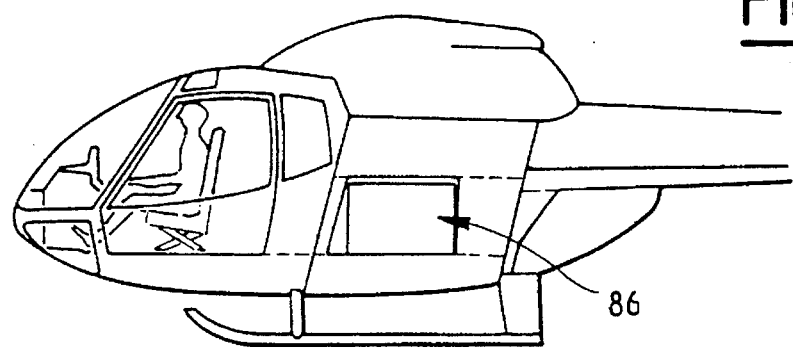
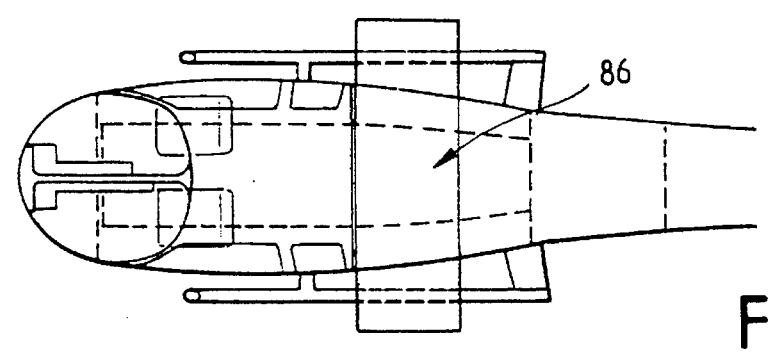
FIG.15

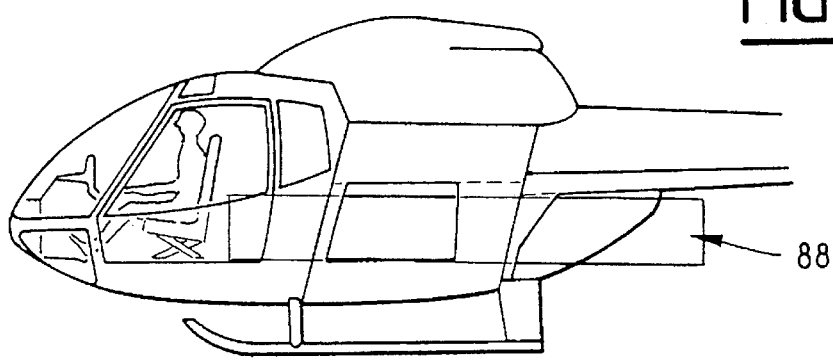
FIG. 16
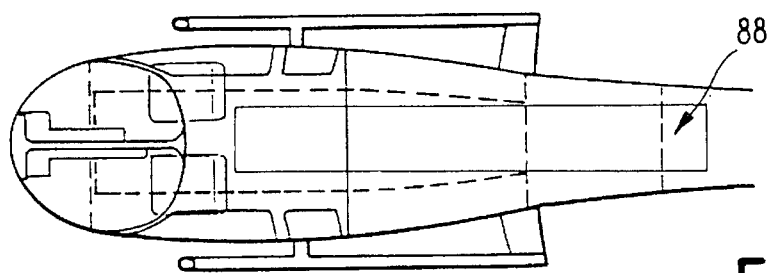
FIG. 17
FIG. 18
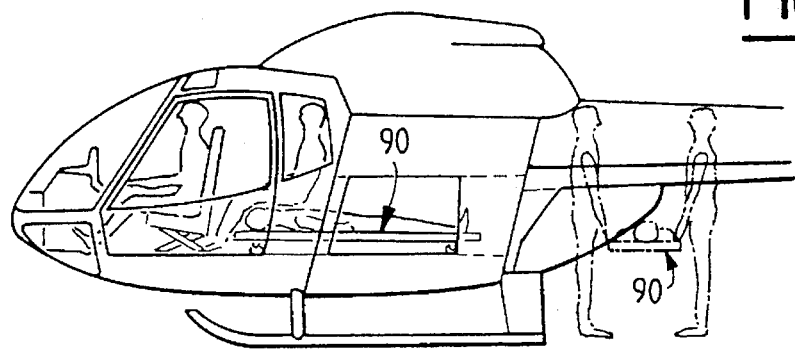
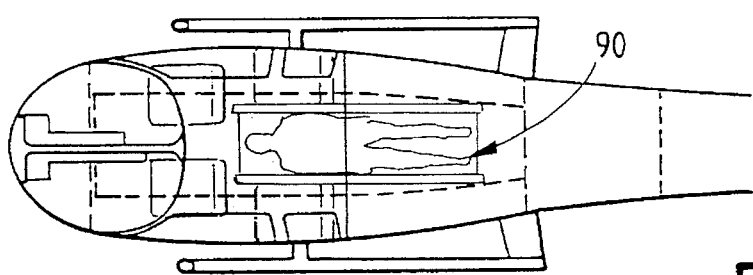
FIG. 19

FUSELAGE STRUCTURE FOR HELICOPTER

This is a Continuation of U.S. application Ser. No. 08/091,312, filed Jul. 14, 1993, now abandoned.

The present invention relates to a helicopter fuselage of the type including a central structure to which are linked a front structure, a rear structure and a landing gear and which supports a transmission gearbox, a main rotor and at least one engine, and of the type in which the central structure includes a skeleton fitted with covering elements which define the external shape of the fuselage.

Although the fuselage designed according to the invention may be used in numerous applications, the present invention will be more especially described below in relation to the design of a light helicopter, and more particularly of a helicopter including a cabin which is cantilevered with respect to the transverse plane of the aircraft containing the vertical passing through the centre of the hub of the main rotor.

According to a conventional design, the general architecture of a light helicopter includes three essential parts which carry out distinct functions.

The first part, called central structure, forms a rigid assembly to which are transmitted all the forces which are applied to the aircraft during its various phases of flight and especially the forces due to the main rotor, to the anti-torque rotor, to the landing gear, to the transported loads, etc.

This central structure also serves as a support for various components of the helicopter, and especially for the transmission gearbox, for the main rotor, for the engines and for the fuel tanks.

The second part, called rear structure or tail boom, is linked to the central structure and it especially supports the rear anti-torque rotor. This rear structure is in principle of the shell or monocoque type, and it consists of formers, or frames, of generally circular or near-circular shape, which exhibit a very great rigidity and which are enveloped by stressed skin elements which contribute to the rigidity of the rear structure and which are, to this end, stiffened longitudinally in deflection, for example by stringers. The rear structure is usually bolted or riveted on to the rear face of the central structure.

The third part, also called front structure or ring frame, generally consists of a skeleton of welded tubes, or of elements produced from composite materials, forming a cockpit canopy chassis on which are fixed the various doors, the roof and the look-out bubble. This canopy structure is usually fixed by bolting or by riveting on to the cabin floor and on to the front face of the central structure.

For the design of the central structure, various solutions have been proposed so as especially to confer great rigidity on it.

According to a first design, the central structure includes a skeleton produced in the form of a tubular trellis which is fitted with fixed or removable covering elements, as well as movable elements such as doors, which constitute the envelope skin of the central part of the helicopter fuselage.

In order to enhance the rigidity of the central structure and to simplify the production thereof, it has been proposed to produce it by means of two formers or rigid frames, or by means of stiffened, solid partitions forming formers, and whose outer contours correspond to the shape of the fuselage. These two formers are linked together by stressed skin elements which contribute to the rigidity of the structure, whose shape corresponds to the external envelope of the fuselage and which are stiffened longitudinally in deflection by stringers in order to form a structure of the shell or monocoque type. The formers may also be linked by longitudinal booms or longerons and thin, non-stiffened skin elements which constitute the envelope skin of the fuselage, forming a thin-web structure or semi-stressed skin structure, and/or longitudinal partitions.

The central structure then exhibits the shape of a box section and is generally stiffened at its lower part by the ring frame structure whose front part, which extends cantilevered, at least partly supports the cabin and the cockpit. The central structure, in box section shape, includes lateral accesses allowing access to the fuel tanks as well as to one or more transport holds.

Such a design has the main drawbacks of being complex and expensive to produce and of limiting the possibilities for the use of the helicopter, and especially of reducing the capacities and the methods of loading thereof.

The object of the present invention is to remedy these drawbacks.

To this end, according to the invention, the helicopter fuselage of the type set out above is characterized in that the skeleton of the central structure exhibits substantially the shape of a hexahedron consisting of skeleton panels assembled together.

Hence, it is possible to produce the rigid skeleton of the prismatic central structure from generally plane elements which can be fabricated at a reduced cost. This skeleton is moreover particularly rigid and it constitutes the structure, called primary structure, of the helicopter through which pass the general forces applied to the aircraft during flight.

The skeleton preferably exhibits the shape of a substantially parallelepipedal regular hexahedron, consisting of two front and rear transverse panels, of two lateral panels and two upper and lower horizontal panels.

According to a preferred embodiment, each of the transverse panels is extended transversely so as to constitute a transverse partition of the fuselage whose contour corresponds substantially to the profile of the corresponding cross-section of the external shape of the fuselage.

Hence, the skeleton of the central structure is particularly adapted to receive a set of covering elements such as, for example, fairings and casings constituting the external skin of the aircraft, but which do not contribute to the stiffening of the central structure.

So as to facilitate access to the internal volume of the hexahedral skeleton, the transverse panels may each include a central aperture.

The access aperture thus formed may be of large dimensions to the extent that it may be delimited laterally by the two lateral panels.

In the same way, the lateral panels may each include a central aperture.

According to another aspect of the invention, the internal volume of the hexahedral skeleton is partitioned by at least one horizontal partition.

Hence, it is possible easily to break down the internal volume of the skeleton into several volumes to which specific functions may be attributed.

According to a preferred embodiment of the invention, the skeleton is partitioned into three super-imposed areas, by two upper and lower horizontal partitions.

Hence, the upper horizontal partition may interact with the upper horizontal panel and the corresponding portions of the transverse and lateral panels to form an upper box section of the skeleton which constitutes a torsion box section and which may also accommodate a fuel tank.

In a symmetrical way, the lower horizontal partition may interact with the lower horizontal panel and the corresponding portions of the transverse and lateral panels to form a lower box section of the skeleton also constituting a torsion box section capable of accommodating a fuel tank.

The opposing faces of the upper and lower horizontal partitions constitute the roof and the floor of a loading hold of the central structure, to which it is possible easily to gain access through the central apertures formed respectively in the transverse and/or lateral panels.

In order to increase the loading capacities of the hold and to simplify the methods of access to the latter, it is advantageously provided for the central aperture, formed in a transversal panel, to be delimited vertically by the upper and lower horizontal partitions.

Similarly, each central aperture formed in a lateral panel may be delimited vertically by the horizontal separation partitions.

According to the invention, the front structure of the helicopter fuselage may include two longerons which are linked respectively to the lower parts of the lateral panels of the skeleton of the central structure.

Hence, it is possible to ensure ideal transmission of the loading forces from the cabin towards the lower part of the central skeleton produced in the shape of a box section.

According to a preferred embodiment of the invention, a part of each of the two longerons is produced in a single piece with the corresponding lateral panel.

Hence, it is possible to produce, at lower cost, a part of the front structure which is integrated into the central structure and to further enhance the transmission of the forces.

According to another characteristic of the invention, the front structure includes a cabin floor which extends substantially in the extension of the lower horizontal partition.

Hence, when the front transverse panel of the central skeleton includes a very high central aperture, delimited vertically by the lower horizontal separation partition, the cabin floor and the lower horizontal partition form a substantially continuous loading plane.

According to another characteristic of the invention, the front structure includes means for attaching the front structure to the front transverse panel of the central skeleton which completes its link with the central structure.

In the same way, the rear structure includes means for attachment to the rear transverse panel, and preferably means for attachment to the portion of the rear transverse panel which delimits the upper bending box section of the central skeleton.

The figures of the attached drawings will make it clear how the invention can be produced. In these figures, identical references designate similar elements.

FIG. 12 is a side elevation view of the helicopter fuselage illustrating a first loading mode for the hold formed in the central skeleton.

FIG. 13 is a top view in partial section of the helicopter illustrated in FIG. 12.

FIGS. 14 to 21 are views, forming similar pairs with those illustrated by FIGS. 12 and 13, which represent various modes of loading and of utilization of a helicopter whose fuselage is produced in accordance with the teachings of the invention.

Figure 1:
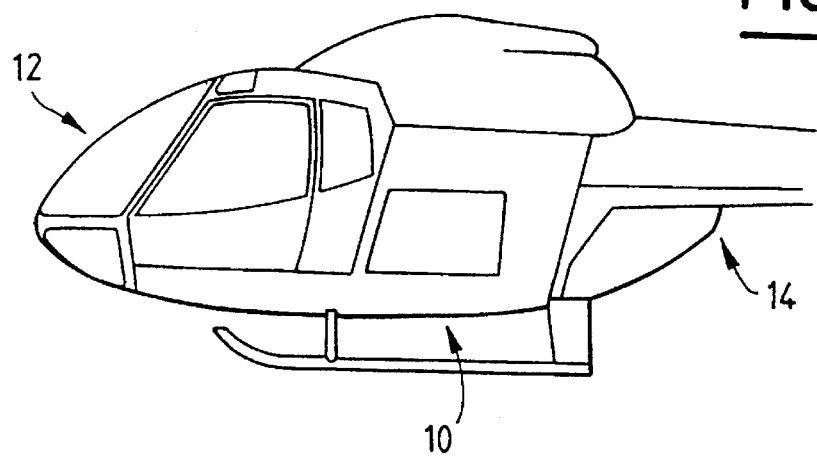
FIG. 1 is a partial side view of a light helicopter whose central structure is produced in accordance with the teachings of the invention.

The helicopter illustrated in FIG. 1, includes a central part 10, a front part 12 and a rear part 14.

Figure 2:
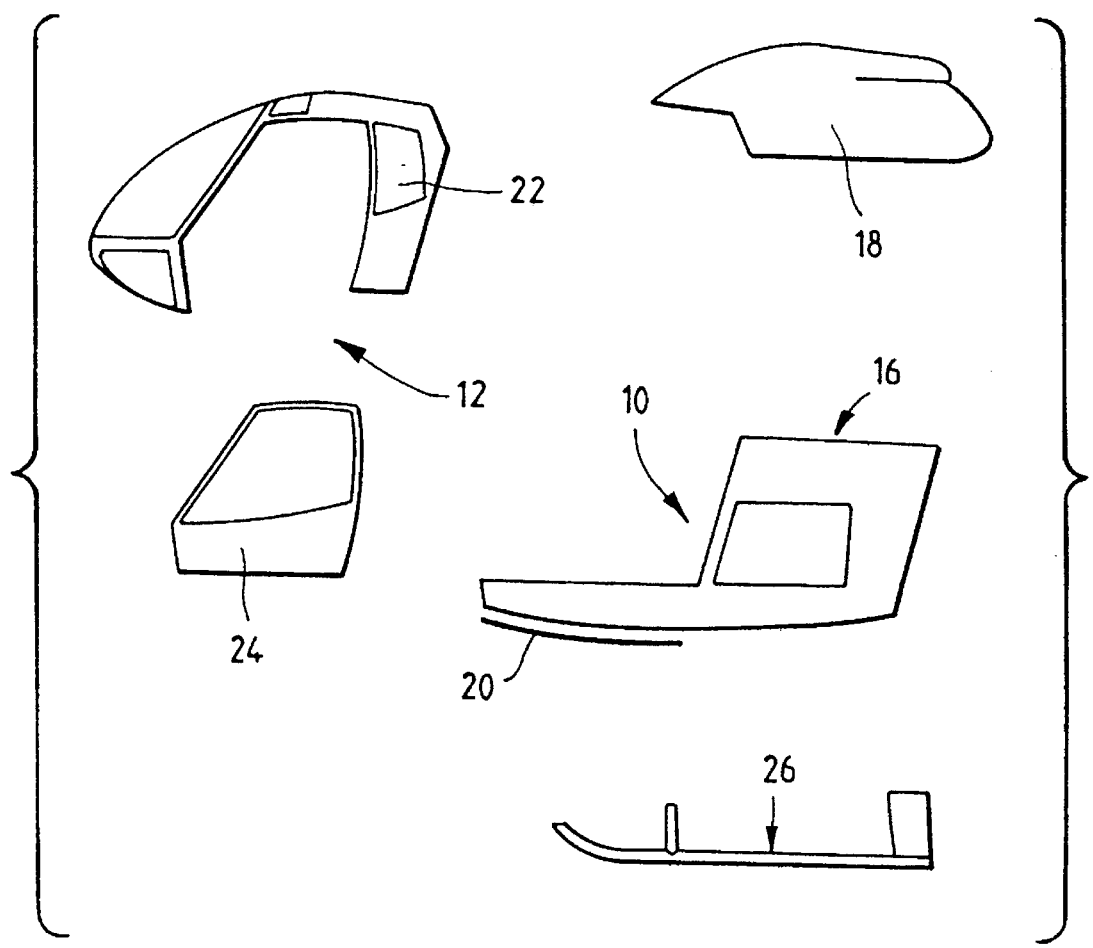
FIG. 2 is a view similar to that of FIG. 1 in which the various components are illustrated in an exploded way to reveal the general shape of the central skeleton produced in accordance with the teachings of the invention.

The central part 10 consists of a central skeleton 16 illustrated in FIG. 2 on which are mounted covering elements such as, for example, an upper casing 18 and a lower fairing 20.

The front part 12 includes a canopy 22 and doors 24.

The rear part 14 is, according to a conventional design, constituted by a tail boom which will not be described in further detail.

The central part 10 also accommodates a landing gear 26, for example of the type with skids.

Figure 4:
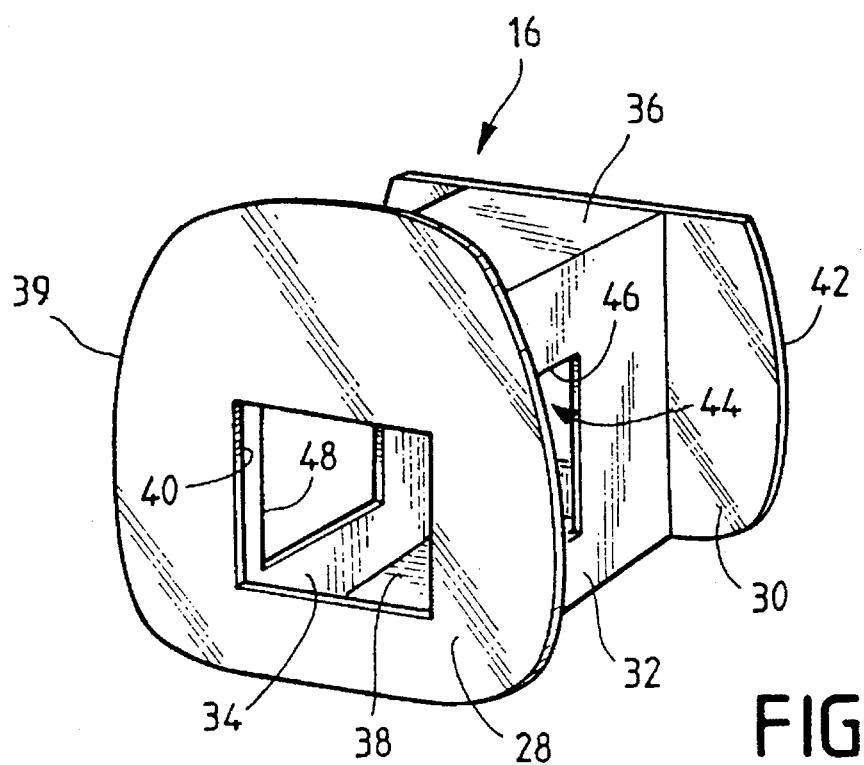
FIG. 4 is a view in perspective on which are represented the six main constituent panels of the hexahedral skeleton with their respective apertures.
Figure 5:
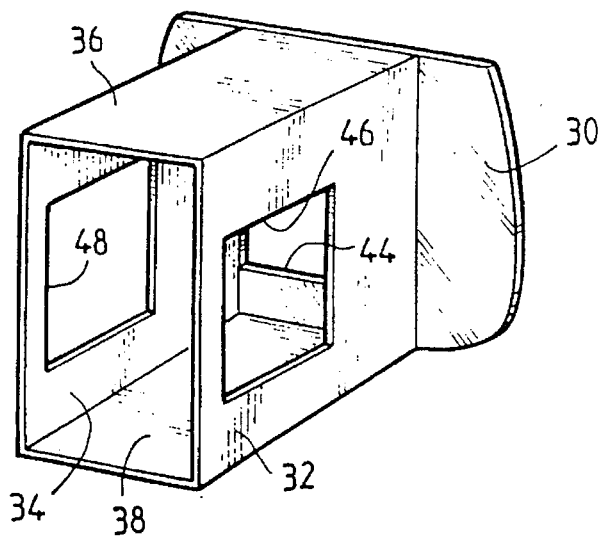
FIG. 5 is a view similar to that of FIG. 4, from which the front transverse panel has been taken off.
Figure 6:
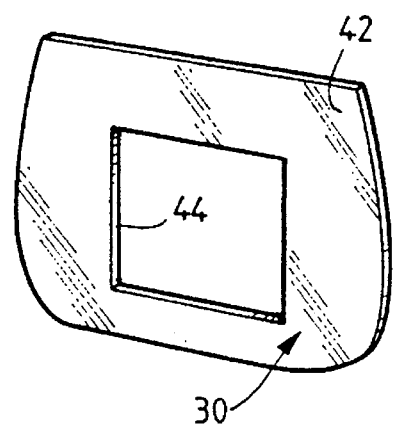
FIG. 6 is a detail view illustrating the rear transverse panel in perspective.

In accordance with the invention, the central part 10 of the structure of the helicopter includes a skeleton 16 illustrated especially in FIGS. 4 to 6, which exhibits substantially the shape of a parallelepipedal hexahedron.

The skeleton 16 consists of a front transverse panel 28, of a rear transverse panel 30, of a right lateral panel 32, of a left lateral panel 34, of an upper horizontal panel 36 and of a lower horizontal panel 38.

The front transverse panel 28, which is provided for supporting the front structure of the helicopter, extends transversely beyond the rectangular contour delimited by the side panels 32, 34 and by the upper panel 36, so as to constitute a transverse partition of the fuselage, whose external contour 39 corresponds substantially to the external shape of the envelope of the central part of the helicopter fuselage.

The front transverse panel includes a rectangular central aperture 40 whose width is such that it extends transversely as far as the lateral panels 32 and 34.

The rear transverse panel 30, which is provided to support the tail boom and the rear cross-member of the skid-type landing gear, also extends transversely on either side of the lateral panels 32 and 34, so that its contour 42 corresponds in part to the profile of the fuselage in its central part.

The rear transverse panel 30 includes a rectangular central aperture 44, of the same dimensions as those of the central aperture 40 (FIG. 6).

The parallel lateral panels 32 and 34 are of substantially rectangular shape and each include a rectangular central aperture 46 and 48 respectively.

Figure 3:
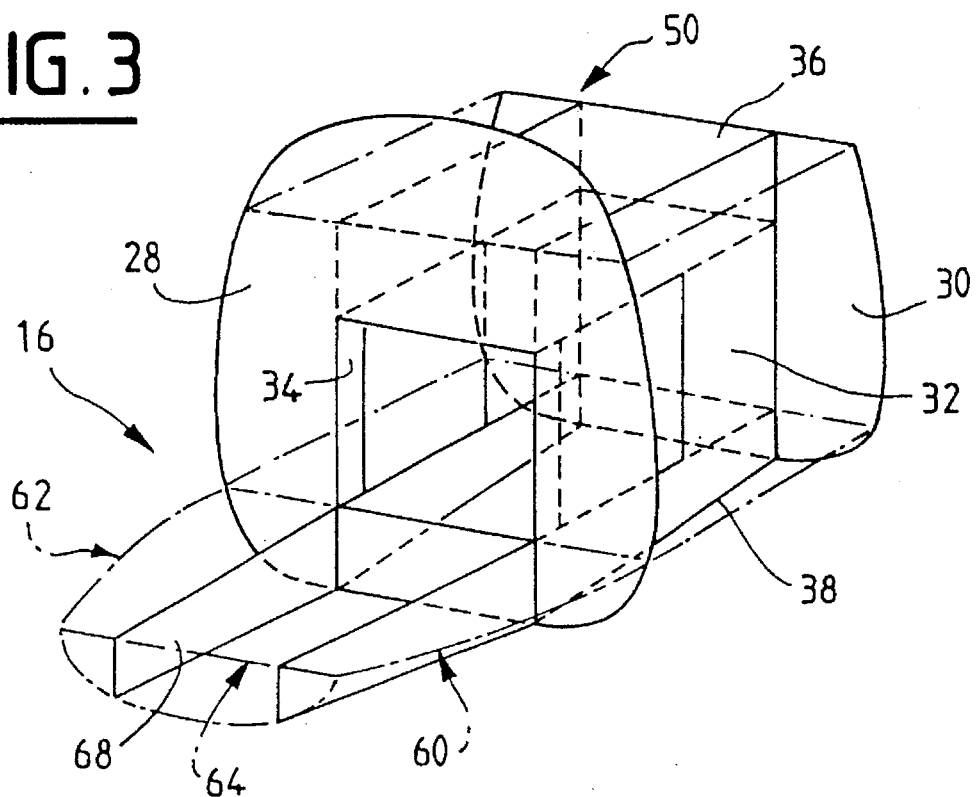
FIG. 3 is a diagrammatic view in perspective of a preferred embodiment of the central skeleton, whose constituent panels are illustrated in solid lines or in dotted lines, and on which are also represented supplementary elements, in silhouette by the use of dots-and-dashes.

The upper panel 36 is a solid rectangular panel which is provided for supporting the main transmission gearbox, the suspension rods of the rotor mast, designated by the reference 50 in FIG. 3, the engine or engines, as well as the control elements of the main rotor.

The panels 28, 30, 32, 34 and 36 are, for example, produced in pressed aluminum alloy, this technique making it possible to obtain a stiffened panel by virtue of local stampings in a single operation from a metal flank, and flanged holes fitted with the interfaces necessary for joining it with the other panels, for example by means of profiled sections such as fish-plates.

By way of variant, the panels could, for example, be produced from composite materials.

The lower horizontal panel 38 is preferably produced in the form of an aluminum/honeycomb synthetic structure sandwich, especially when it is provided for supporting the mass of a fuel tank, as will be explained later.

In accordance with the invention, the internal volume of the hexahedral skeleton 16 is divided into three horizontally superimposed volumes.

Figure 7:
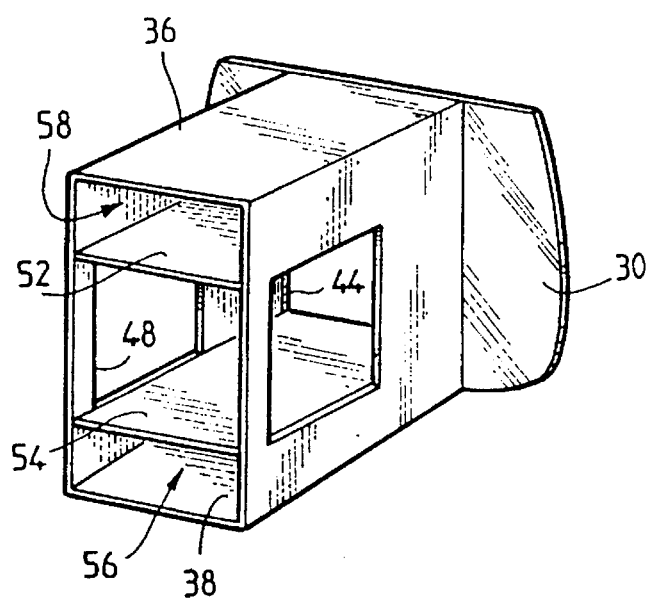
FIG. 7 is a view similar to that of FIG. 5 revealing the two horizontal partitions for separation of the internal volume of the hexahedral skeleton.
Figure 8:
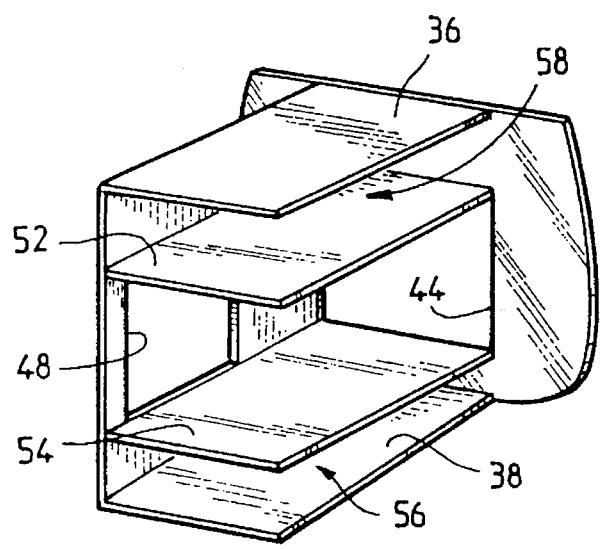
FIG. 8 is a view similar to that of FIG. 7, from which one of the two transverse panels has been taken off.

This solution is illustrated especially by FIGS. 7 and 8 in which an upper horizontal partition 52 and a lower horizontal partition 54 are illustrated.

The partitions 52 and 54 consist of panels of substantially rectangular shape.

The partitions 52 and 54 are positioned vertically in such a way as vertically to delimit the apertures 40, 44, 46 and 48 formed in the corresponding vertical panels.

The lower horizontal partition 54, which is preferably produced in stamped aluminum alloy, closes off, from the top and in a leak-tight way, a first compartment or lower box section 56.

The parallelepipedal lower box section 56 constitutes a torsion box, as well as lower fuel tank.

The lower partition 54 has to be capable of being dismantled so as to be able to gain access to a flexible blivet (not represented) which receives the fuel and which is arranged in the box section 56.

The upper horizontal partition 52, which is preferably produced in the form of a sandwich structure, closes a compartment or upper box section 58, from the bottom and in a leak-tight way.

The parallelepipedal upper box section 58 constitutes a torsion box section as well as an upper fuel tank.

The upper partition 52 must be designed so as to be able to be dismantled in such a way as to allow access to the blivet which contains the fuel.

As is illustrated in FIG. 3, the front structure of the helicopter includes two front longerons 60 and 62 for constituting a structure said to be in the shape of a ring frame.

The longerons 60 and 62 may be linked transversely by crosspieces (not represented), as well as by a sheet of light alloy 64 constituting all or part of the cabin floor.

Figure 9:
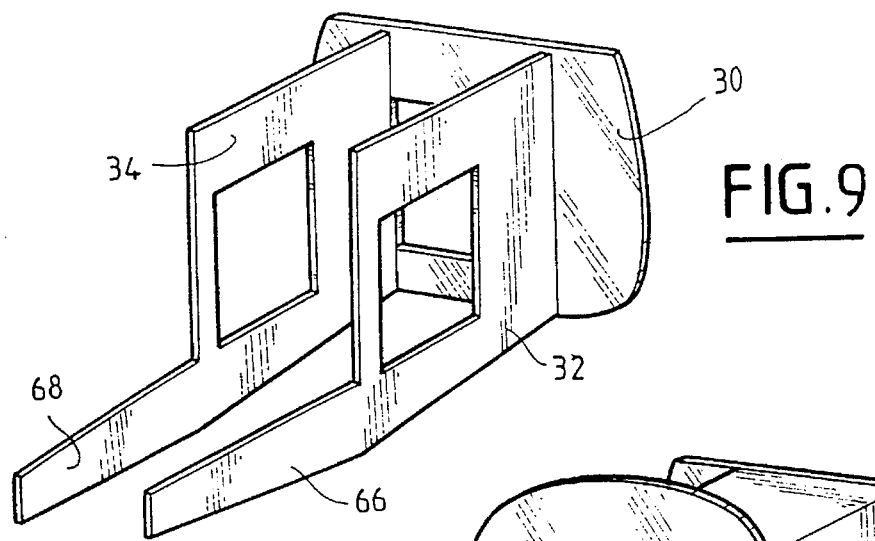
FIG. 9 is a view in perspective on which are represented the rear transverse panel and an embodiment variant of the two lateral panels which each include a front longeron part.
Figure 10:
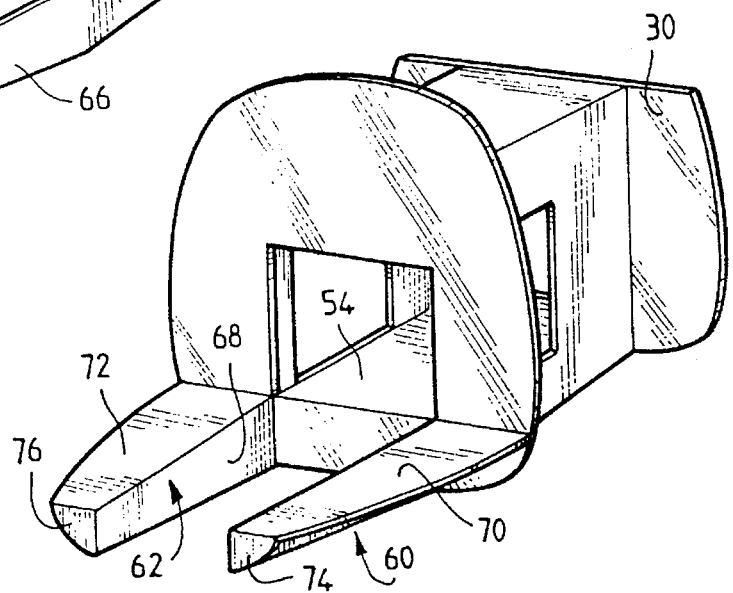
FIG. 10 is a view similar to that of FIG. 9 on which are further illustrated the other constituent panels of the skeleton, the horizontal separation partitions as well as stiffening elements for the front longerons.

According to the embodiment illustrated in FIGS. 9 and 10, the longerons 60 and 62 consist of in essence of two elongations 66 and 68 of the lateral panels 32 and 34, which, for example, are made of the same material as the latter.

The longerons are stiffened by complementary horizontal plates 70 and 72 and by transverse end plates 74 and 76, illustrated in FIG. 10.

Figure 11:
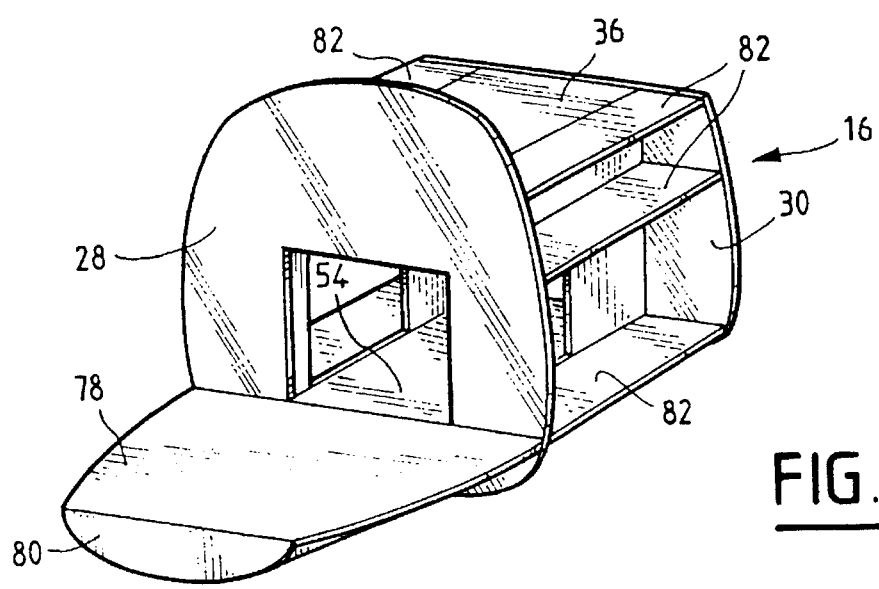
FIG. 11 is a view similar to that of FIG. 10 on which are illustrated complementary elements especially constituting the cabin floor as well as complementary shelf structures.

In the variant illustrated in FIG. 11, the cabin floor may consist of a single horizontal plate 78 and the stiffening of the longerons may be completed by a front transverse plate 80.

The longerons 60 and 62 may, by way of variant, be produced in the form of elements independent of the lateral panels and be fixed by fish-plates on to the lower lateral flanks of the lower torsion box section 56 of the central hexahedral skeleton 16.

The rear transverse partition 30 is provided to receive the tail boom which is, for example, constituted by a sandwich-structure skin stiffened by formers or rigid frames constituting a monocoque structure.

The tail boom is bolted discretely, preferably at four points situated at the four corners of the upper portion of the rear transverse panel 30 which delimits the upper torsion box section 58.

As is illustrated by FIGS. 3 and 11, the central skeleton 16 may be completed by horizontal shelf structures 82 which extend longitudinally between the transverse partitions 28 and 30 and which are provided to receive electrical equipment items installed laterally, for example.

The design according to the invention of a hexahedral central skeleton makes it possible to produce the central structure from plane elements which are particularly easy to produce and require less complex and less expensive tooling than that necessary for the production of structural elements with awkward shapes used for the fabrication of central structures of the monocoque type.

The plane panels may be assembled rapidly and reliably.

The external forms of the fuselage of the helicopter, in its central part, result from the use of covering elements which do not contribute to the transmission of the main forces.

The optimal use of the internal volume of the hexahedral skeleton makes it possible, by dividing it into three superimposed vertical volumes, to produce two torsion box sections at the upper and lower part providing an excellent take-up of the forces, making it possible to reduce the overall mass of the central skeleton and making it possible to simplify the fixing of the rear structure on to the central structure.

The division of the internal volume of the hexahedral skeleton also makes it possible to clear a large loading volume, called hold, in the central area.

The hold includes, on each of its four vertical faces, a wide aperture allowing multiple uses of the aircraft.

The hold may be equipped at the front with a hatch door opening out into the cabin while its floor, constituted by the lower horizontal partition 54, preferably extends into the extension of the cabin floor.

To the rear, that is to say beyond the rear transverse panel 30, the hold may be closed by casings forming doors, which additionally provide for the continuity of the aerodynamic flows between the central part of the fuselage and the tail boom.

The lateral skin elements of the central skeleton 16 may be fitted laterally, to left and to right, with a door of dimensions corresponding to those of the lateral aperture of the hold.

The hexahedral hold fitted with its four apertures which coincide with doors or hatch doors allow numerous uses which are illustrated in FIGS. 12 to 21.

In FIGS. 12 and 13, a conventional use is seen in which the hold 84 constitutes a significant loading volume, of the baggage compartment type with various possibilities for lateral access or access from the rear.

FIGS. 14 and 15 illustrate the possibility of transversely transporting a load 86 of great length and of significant weight protruding laterally through the apertures 46 and 48, which is particular advantageous to the extent that this does not give rise to an alteration in the centring of the masses of the helicopter, since the load extends transversely substantially below the center of the rotor head.

In FIGS. 16 and 17, the possibility is illustrated of longitudinally transporting a load 88 of great length which may extend (through the aperture 40), beyond the hold, partly into the cabin, for example by carrying out, in advance, dismantling of one or more rear seats. As can be seen in FIGS. 16 and 17, the load may protrude longitudinally rearwards, beyond the central part, through the central aperture 44 formed in the rear transverse panel 30, after having dismantled the rear doors, and this can be done without interfering with the tail boom which is linked to the upper torsion box section above the rear aperture 44.

In FIGS. 18 and 19 the possibility is illustrated of using the helicopter in accordance with the invention for a medical evacuation with a stretcher 90, which may, for example, slide on rails, loaded through the rear.

This use makes it possible to make the flight after having closed all the doors and with two members of the medical care team, or with one person and a medical equipment unit.

Figure 20:
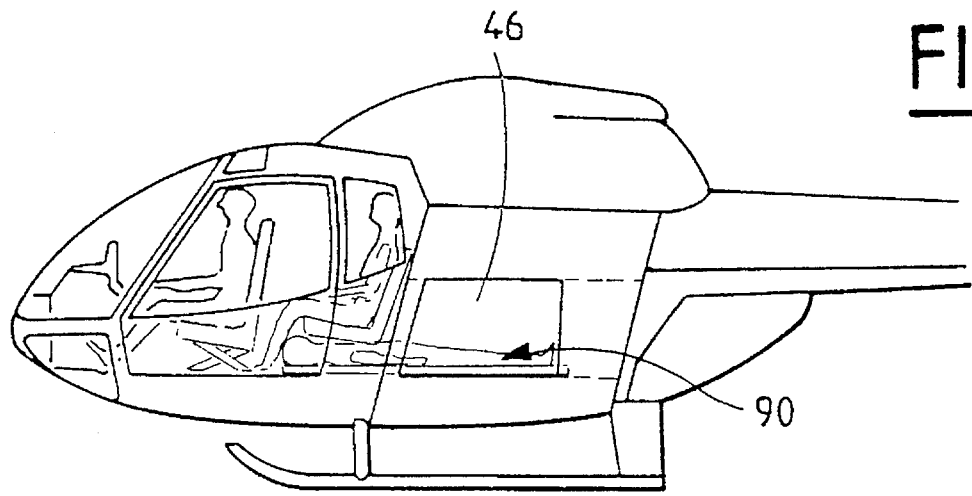
Figure 21:
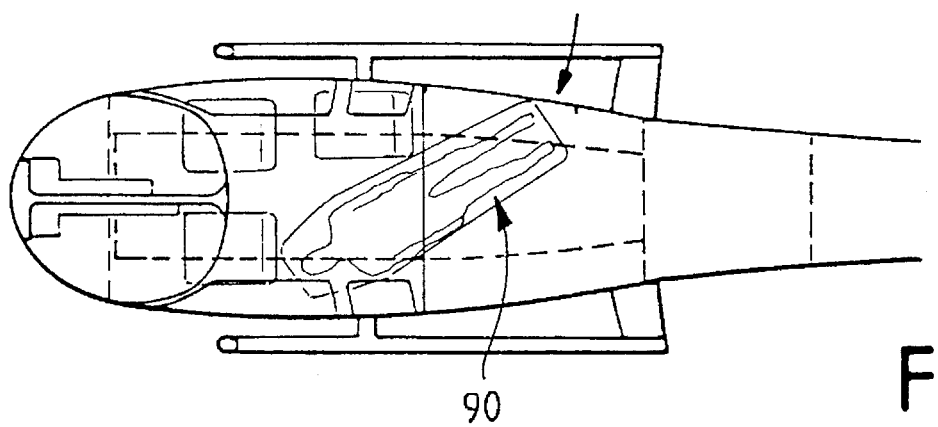

In FIGS. 20 and 21, an application is illustrated for a medical evacuation with lateral loading of the stretcher 90. The flight may be carried out after closing all the doors. With respect to the preceding configuration, this medical evacuation mode allows the stretcher to be winched, or ground loading which the pilot may monitor visually from his pilot's position. Moreover, the wounded and the medical care personnel are less exposed to the exhaust gases from the engine as well as to the turning rotor. The medical personnel also have easier access to the door for loading the stretcher.

Other uses are possible, and especially those requiring transport of bulky accessories, for example for agricultural spraying, by detaching the lateral doors of the hold, and this can be done without degrading the centring of the masses of the helicopter.

The design according to the invention also facilitates maintenance operations to the extent that the threshold of the lateral doors of the hold constitutes a platform for the technicians who have to perform maintenance on the main mechanical elements situated on the upper horizontal panel 36.

The hold also allows the servicing personnel easy access to the detachable horizontal partitions which close off the compartments accommodating the fuel tanks when maintenance on the latter is necessary.

Finally, the architecture according to the invention confers numerous possibilities for configuring flight controls, whether rigid or otherwise, in the various spaces which are left clear between the central skeleton and the outer skin elements of the fuselage. The flight controls then become easily accessible for all maintenance operations by detaching access hatches.

I claim:

1. Helicopter fuselage including a central structure (10) to which are linked a front structure (12), a rear structure (14) and a landing gear (26) and which supports a transmission gearbox, a main rotor and at least one engine (50), said central structure including a skeleton (16) fitted with covering elements which define the external shape of the fuselage, wherein said skeleton (16) has substantially the shape of a hexahedron consisting of six spaced skeleton plane panels (28-38) assembled together, said six skeleton plane panels comprising a front transverse panel (28), a rear transverse panel (30), two lateral panels (32, 34), an upper horizontal panel (36), and a lower horizontal panel (38).

2. The helicopter fuselage as claimed in claim 1 wherein the rear structure includes means for attachment to the rear transverse panel (30).

3. The helicopter fuselage as claimed in claim 1, wherein each of the transverse panels (28, 30) is extended transversely so as to constitute a transverse partition whose contour (39, 42) corresponds substantially to the profile of the corresponding cross-section of the external shape of the fuselage.

4. The helicopter fuselage as claimed in claim 1, wherein at least one of the transverse panels (28, 30) includes a central aperture (40, 44).

5. The helicopter fuselage as claimed in claim 4, wherein the said central aperture (40, 44) is delimited laterally by the two lateral panels (32, 34).

6. The helicopter fuselage as claimed in claim 1, wherein at least one (32, 34) of the lateral panels includes a central aperture (46, 48).

7. The helicopter fuselage as claimed in claim 1, wherein the internal volume of the hexahedral skeleton (16) is partitioned by at least one horizontal partition (52, 54).

8. The helicopter fuselage as claimed in claim 7, wherein the internal volume of the hexahedral skeleton is partitioned into three vertically superimposed areas by an upper horizontal partition (52) and a lower horizontal partition (54).

9. The helicopter fuselage as claimed in claim 8, wherein the upper horizontal partition (52) in combination with the upper horizontal panel (36) and with corresponding portions of the transverse (28, 30) and lateral (32, 34) panels form an upper box section (58) of the skeleton, wherein the lower horizontal partition (52) in combination with the lower horizontal panel (38) and the corresponding portions of the transverse (28, 30) and lateral (32, 34) panels form a lower box section (56) of the skeleton, and wherein the opposing faces of the upper (52) and lower (54) horizontal partitions constitute the bulkhead and the floor of a hold.

10. The helicopter fuselage as claimed in claim 4 wherein the internal volume of the hexahedral skeleton is partitioned into three vertically superimposed areas by two upper (52) and lower (54) horizontal partitions, each said central aperture (40, 44) being delimited vertically by said upper and lower horizontal partitions.

11. The helicopter fuselage as claimed in claim 8, wherein each central aperture (46, 48) formed in a lateral panel (32, 34) is delimited vertically by the upper (52) and lower (54) horizontal partitions.

12. The helicopter fuselage as claimed in claim 1, wherein the front structure includes two longerons (60, 62) which are linked respectively to the lower parts of the lateral panels (32, 34).

13. The helicopter fuselage as claimed in claim 12, wherein at least a part of each of the two longerons (60, 62) is produced in a single piece with the corresponding lateral panel (32, 34).

14. The helicopter fuselage as claimed in claim 8, wherein the front structure includes a cabin floor which extends substantially in the extension of the lower horizontal partition (54).

15. The helicopter fuselage as claimed in claim 1, wherein the front structure includes means for attachment to the front transverse panel (28).

16. The helicopter fuselage as claimed in claim 2, wherein the rear structure includes means for attachment to the portion of the rear transverse panel (30) which delimits the upper box section (58).

* * * * *